United States Patent [19]

Härtel

[11] 3,931,710
[45] Jan. 13, 1976

[54] METHOD AND INSTALLATION FOR THE PREDETERMINED ADDITION OF SECONDARY AIR FOR THE OPTIMUM COMBUSTION OF EXHAUST GASES OF INTERNAL COMBUSTION ENGINES

[75] Inventor: Günter Härtel, Rosellen, Germany

[73] Assignee: Deutsche Vergaser GmbH & Co. Kommanditgesellschaft, Neuss, Germany

[22] Filed: May 1, 1973

[21] Appl. No.: 356,193

[30] Foreign Application Priority Data
Nov. 10, 1972 Germany............................ 2254961

[52] U.S. Cl.................. 60/276; 60/290; 123/119 D; 123/124; 251/47; 251/61
[51] Int. Cl.[2] ......................................... F02B 75/10
[58] Field of Search ............ 60/289, 290, 285, 276; 251/61, 47, 55; 123/124, 119 D

[56] References Cited
UNITED STATES PATENTS

| | | | |
|---|---|---|---|
| 1,798,973 | 3/1931 | Cordier................................. | 251/47 |
| 3,059,419 | 10/1962 | Schnabel............................... | 60/290 |
| 3,086,353 | 4/1963 | Ridgway ............................... | 60/290 |
| 3,106,820 | 10/1963 | Schaffer................................ | 60/290 |
| 3,195,805 | 7/1965 | Cholvin.................................. | 251/61 |
| 3,430,437 | 3/1969 | Saussele................................ | 60/290 |
| 3,696,618 | 10/1972 | Boyd..................................... | 60/276 |
| 3,748,855 | 7/1973 | Day....................................... | 60/290 |
| 3,751,916 | 8/1973 | Hayashida............................. | 60/290 |
| 3,768,259 | 10/1973 | Carnahan.............................. | 60/276 |
| 3,788,070 | 1/1974 | Camarasa ............................. | 60/290 |
| 3,791,144 | 2/1974 | Lang...................................... | 60/285 |
| 3,799,301 | 3/1974 | Bentley................................. | 60/289 |
| 3,805,522 | 4/1974 | Sheppard.............................. | 60/290 |
| 3,827,237 | 8/1974 | Linder .................................. | 60/276 |

*Primary Examiner*—Douglas Hart
*Attorney, Agent, or Firm*—Haseltine, Lake & Waters

[57] ABSTRACT

Method and installation for the predetermined addition of secondary air used in effecting optimum combustion of internal combustion engine exhaust gases, including a control arrangement including one or more measuring devices sensing engine operating or exhaust gas contents and, in response to the sensed conditions, regulating the addition of secondary air in order to obtain optimum exhaust gas combustion.

2 Claims, 7 Drawing Figures

METHOD AND INSTALLATION FOR THE PREDETERMINED ADDITION OF SECONDARY AIR FOR THE OPTIMUM COMBUSTION OF EXHAUST GASES OF INTERNAL COMBUSTION ENGINES

FIELD OF THE INVENTION

The present invention relates to a method for the measurement of supplementary or secondary air utilized for obtaining the optimum combustion or after-burning of the exhaust gases of internal combustion engines, and in which the added quantity of the secondary air is determined by means of a control installation. It has been ascertained as being essential that deleterious materials, which are present in the exhaust gases of the internal combustion engines, such as carbon monoxide (CO), hydrocarbons ($C_xH_y$) and nitric oxide ($NO_x$), be converted through suitable means into harmless chemical compounds. In order to accomplish this effect, thermally and catalytically operating reactors or after-burners are generally utilized.

DISCUSSION OF THE PRIOR ART

When an internal combustion engine is driven under variable operative conditions, there occur constant changes in the composition of the exhaust gases. The foregoing changes disturb the after-burning sequence, inasmuch as at any particular time there is experienced an excess, and at another time, a shortage of oxygen available for use in the after-burning process. In order to compensate for these shortcomings, it is presently known that the internal combustion engines may be operated with a deficiency or insufficiency of air ($\lambda$ is less than 1), and to introduce the combustion air required for the after-burning by means of a motor-driven air pump. An arrangement of that type is described and illustrated in German laid-open specification No. 2,035,591.

A drawback of the prior art installations consists of in that the additive quantities of secondary air cannot be controlled in a precise and sufficiently rapid manner. Consequently, the after-burner cannot be optimally operated, and the deleterious materials in the exhaust gases cannot be adequately converted into harmless components.

SUMMARY OF THE INVENTION

The present invention, accordingly, has, as an object, the optimal conversaion of the deleterious materials contained in the exhaust gases of an internal combustion engine into harmless materials within the extent of the most advantageous engine air-fuel mixture relationship, and for which purpose there is provided a precision control arrangement for the addition of secondary air.

The problems encountered in the prior art are herein inventively solved in that the control arrangement for the addition of secondary air is coordinated from at least three external control or guide conditions or measures which are in a non-linear interdependent relationship with each other. Advantageously, an additional control guide condition provides further external guidance into the control installation, and acts independently of the other control guide conditions.

Advantageously, as the control guide conditions there may be utilized the pressure on the suction side (suction conduit pressure), the pressure on the exhaust side (exhaust gas back-pressure), the engine speed or R.P.M., the oxygen or the carbon monoxide content of the exhaust gases, either concurrently or selectively.

In a further embodiment of the invention one or more non-linear interdependent control guide conditions may be influenced by the independent or separate control guide condition.

As a sensor for the measurement of the extent of oxygen or carbon monoxide contained in the exhaust gases there may be employed a suitable measuring receiver having a platinum-coated wall or partition which is formed of zirconium oxide and located whereby the wall on one surface thereof is in communication with the exhaust gases being measured and on its other surface with the atmosphere.

In order to obtain an improved degree of control and concurrently provide for the relief of the air inlet arrangement, the control installation for the introduction of measured quantities of the secondary air is additionally provided with an arrangement for the withdrawal and return of a portion of the air which is conveyed into the control installation. This allows for the addition of the secondary air quantities and the withdrawal of the returning quantities of air through the use of two conical metering plug valves mounted one above the other on a common actuating rod, and which are so positioned relative to each other, whereby upon an increase in the quantity of secondary air, the quantity of returning withdrawal air is reduced and reversed.

The actuating rod for the conical metering plug valves advantageously is fixedly connected with two superimposed spaced membranes having different active or operative surfaces, and in which a control pressure chamber positioned intermediate the membranes preferably is subjected to the exhaust gas back-pressure, and a second control pressure chamber positioned above the upper membrane is subjected to the suction tube pressure. In the foregoing construction, the control pressure chamber which is located above the upper membrane is provided with an inlet aperture having a non-return valve positioned therein, so that inflow into the control pressure chamber is essentially unrestricted, and with the non-return valve being bridged by a narrow bypass aperture so that any outflow from the control pressure chamber is only permitted through the bypass aperture. Consequently, upon a sudden withdrawal of gases, this will prevent the sudden cut-off of the inflow of secondary air.

In order to prevent the forming of an undue high pressure at the inlet side to the inflowing air, the arrangement for the withdrawal and return of a portion of the air flowing into the control installation, in a further embodiment of the invention is provided with a closure member which allows for the return flow as soon as the pressure of the inflowing air reaches a predetermined value. This closure member may be integrally formed with the conical metering plug valve employed for the return flow.

In order to obtain an additional influence over the control guide conditions per se, in another embodiment of the invention there may be provided suitable actuating members in the signal conduits providing one or more of the non-linear interdependent control guide conditions. To obtain this effect, there may be located a signal converter or transformer intermediate the sensors used for the measurement of the oxygen content or of the carbon monoxide content of the exhaust gases and the actuating members of one or more of the signal conduits for the non-linearly interdependent control guide conditions.

In a further embodiment there may be provided, in lieu of or in addition to, a control element at the output of the control installation for the addition of the secondary air, which is actuated in response to the signals emanating from a signal converter, the latter of which receives and converts the signals from the sensors measuring the oxygen or carbon monoxide contents of the exhaust gases.

So long as the secondary air from the internal combustion engine must be conveyed into the suction conduit, it is preferable that downstream of the control element positioned at the outlet of the control installation and used for the addition of secondary air, there is included a control valve through which the secondary air flows and which for maintaining constant the pressure at the valve inlet. When employing pneumatic signal conduits, preferably used are calibrated throttling valves which afford an improved degree of integration of the control impulses.

BRIEF DESCRIPTION OF THE DRAWINGS

Reference is now had to preferred embodiments of the present invention, taken in conjunction with the accompanying drawings, in which.

DETAILED DESCRIPTION

Figure 1:
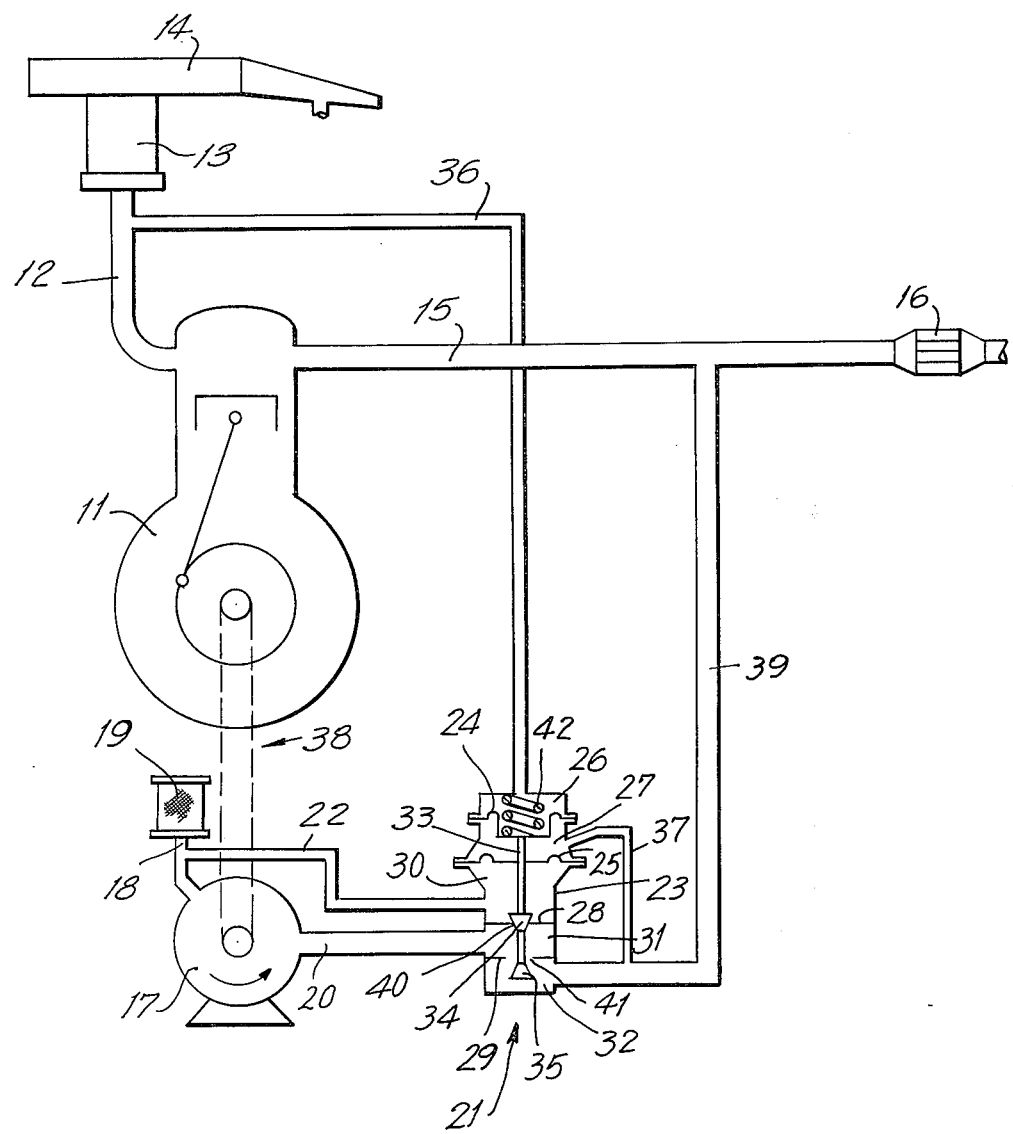
FIG. 1 illustrates an internal combustion engine air intake and exhaust system showing a control installation according to the present invention.

In accordance with the embodiment of FIG. 1, an internal combustion engine 11 includes on its suction side a suction conduit 12 which has a carburetor 13 attached to one end thereof. The inlet of air is effected through an air filter 14. The combustion fuel inlet and air-fuel mixture forming components of the carburetor are not illustrated.

At its exhaust side, the internal combustion engine 11 includes an exhaust collecting conduit 15 which leads toward an after-burner 16. An air pump 17 is connected with a filter 19 through a suction conduit 18, and through which filter secondary air is aspirated from the atmosphere. From the air pump 17 a conduit 20 communicates with a control installation 21. An air return conduit 22 leads from the control installation 21 back into suction conduit 18.

The control installation 21 includes a multiple-component housing 23 which is divided by means of membranes 24 and 25 into control pressure chambers 26 and 27, and through partitions 28 and 29 into pressure chambers 30, 31 and 32. The conduit 20 communicates with the pressure chamber 31, and the air return conduit 22 with the pressure chamber 30.

The membrane 25 has a larger effective or operative surface than membrane 24. Both membranes are fixedly connected to a control rod 33, which is positioned thereon and fastened thereto in superimposed relationship conical measuring valves 34 and 35. The conical valves are cooperatively positioned in, respectively, passages 40 and 41 located in the respective partitions 28 and 29.

Utilized as the non-linear interdependent control parameters are the suction tube pressure, the exhaust gas backpressure, and the engine speed or R.P.M. The suction tube pressure is communicated into the control installation 21 through conduit 36, and the exhaust gas back-pressure through conduit 37. The engine R.P.M. or rotational speed is similarly transmitted into the control installation 21 through a drive 38 directly to the air pump 17, and indirectly air supply quantity, which is dependent upon engine R.P.M., of conduit 20. The secondary air is introduced through conduit 39 into the exhaust gas collecting conduit 15.

In the engine stationary operating mode, both conical measuring or calibrating valves are moved into their lowermost position due to the force of a compression spring 42 acting on membrane 24, so as to close aperture 40 and completely open aperture 41.

During engine operation the air pump 17 pumps, in response to a predetermined engine R.P.M., correspondingly larger or smaller air quantities. At a high suction tube pressure compression spring 42 is unloaded, in view of which the conical valves are downwardly displaced. Consequently, the return flow of secondary air from pressure chamber 31 into the pressure chamber 30 and from there into the air return conduit 22 is either reduced or completely stopped, whereas the aperture 41 is more or less opened so as to allow for the passage therethrough of secondary air from pressure chamber 31 into the pressure chamber 32 and from the latter through conduit 39 into the exhaust gas collecting conduit 15. The lower the suction tube pressure, the higher are conical valves 34 and 35 raised, so as to permit that much more air to be returned, while restricting the delivery of secondary air.

The exhaust gas back-pressure which is present in conduit 39 is communicated through conduit 37 as the control parameter for the control pressure chamber 27. In view of the area or surface differential of membranes 24 and 25, an increasing exhaust gas back-pressure creates an increased opening, whereas a reducing exhaust gas back-pressure created the continued closing of aperture 41.

Figure 2:
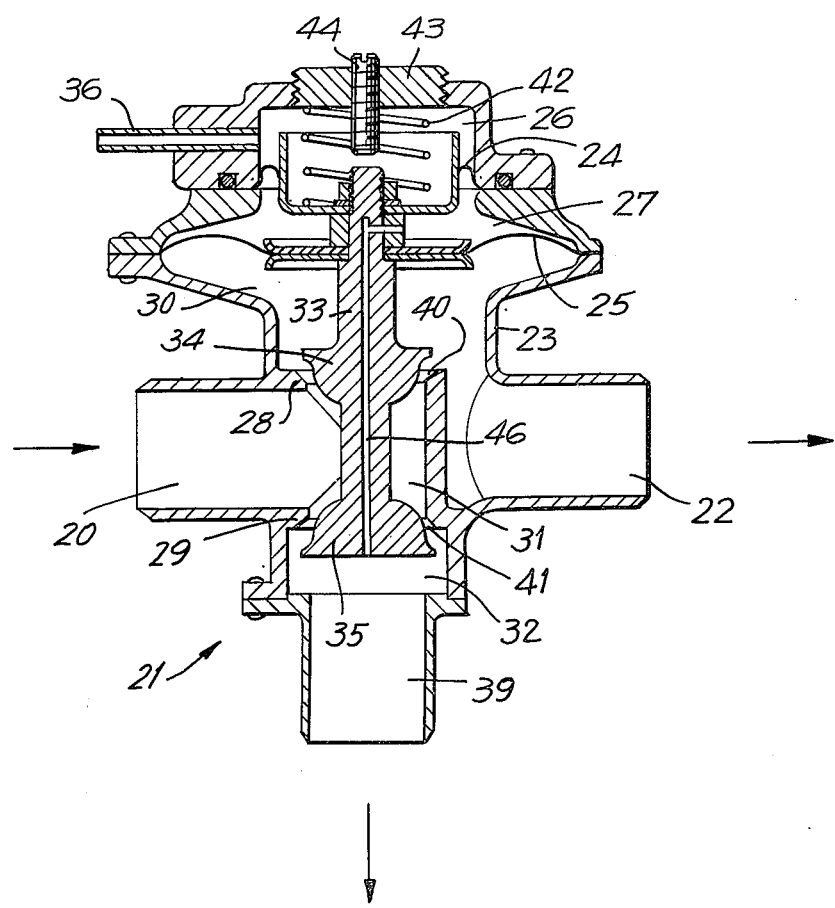
FIG. 2 is a second embodiment of a control installation.

FIG. 2 illustrates another specific embodiment of a control installation 21. In the following details this embodiment advantageously distinguishes over the control installation according to FIG. 1:

In the upper portion of the multiple component housing 23 there is located an adjusting screw 43 which provides for the adjustment of the pre-stressing or loading of compression spring 42, and a second adjusting screw 44 for adjustment of the minimum cross-sectional opening of aperture 41. The control pressure chamber 27 communicates through a bore 45 and a channel 46 with pressure chamber 32, the latter of which communicates through conduit 39 with the exhaust gas collecting conduit 15. This eliminates the requirement for a particular conduit (for example, conduit 37 in FIG. 1).

Figure 3:
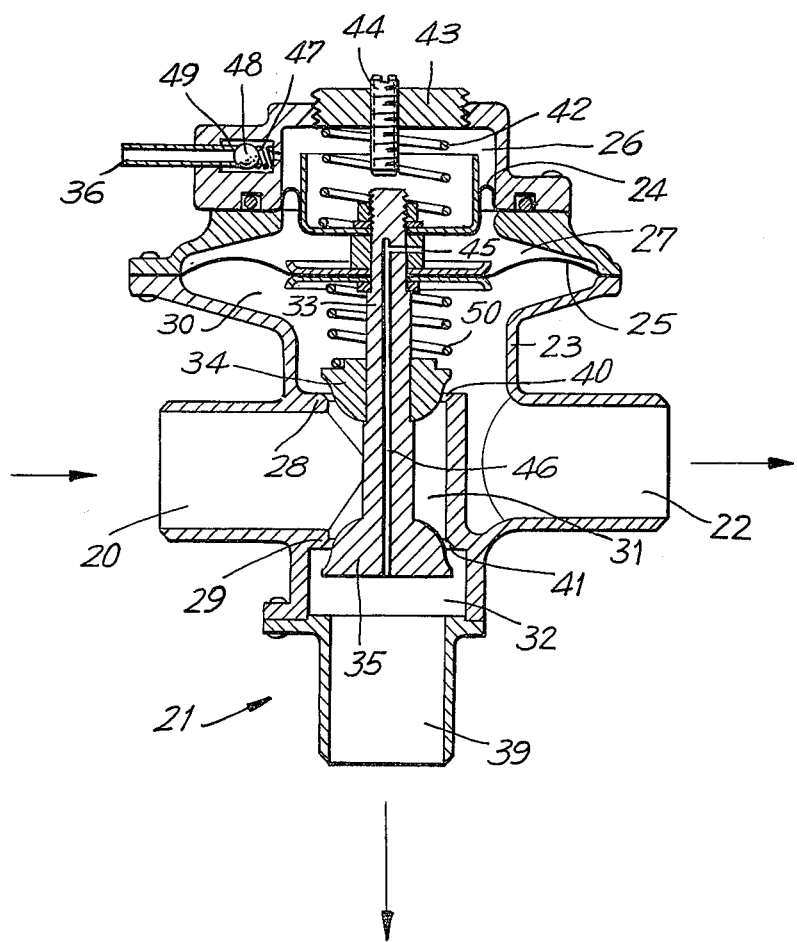
FIG. 3 is a third embodiment of a control installation.

The control installation 21 of the embodiment according to FIG. 3 of the drawings evidences further advantages as compared to the control installation illustrated in FIG. 2. Thus, the control pressure chamber 26 located above membrane 24 includes an inlet aperture 47 in which there is positioned a non-return valve 48 formed of a spring-loaded ball, and in view of the action of which, the air inlet flow from conduit 36 into control pressure chamber 26 is essentially unrestricted. By means of a bypass aperture 49 the non-return valve 48 is bridged in a manner so as to allow air outflow from the control pressure chamber 26 only through the bypass aperture 49. The conical valve 34 in this embodiment is slidably mounted on the control rod 33 and is biased by a compression spring 50. Consequently, the conical valve 34 concurrently forms a closure member which permits air return flow as soon as the pressure of the inflowing air reaches a predetermined value. This is further attained independently of the operative position of the other conical valve 35. This arrangement advantageously and in a single manner protects the apparatus against the unallowable excess pressures.

Figure 4:
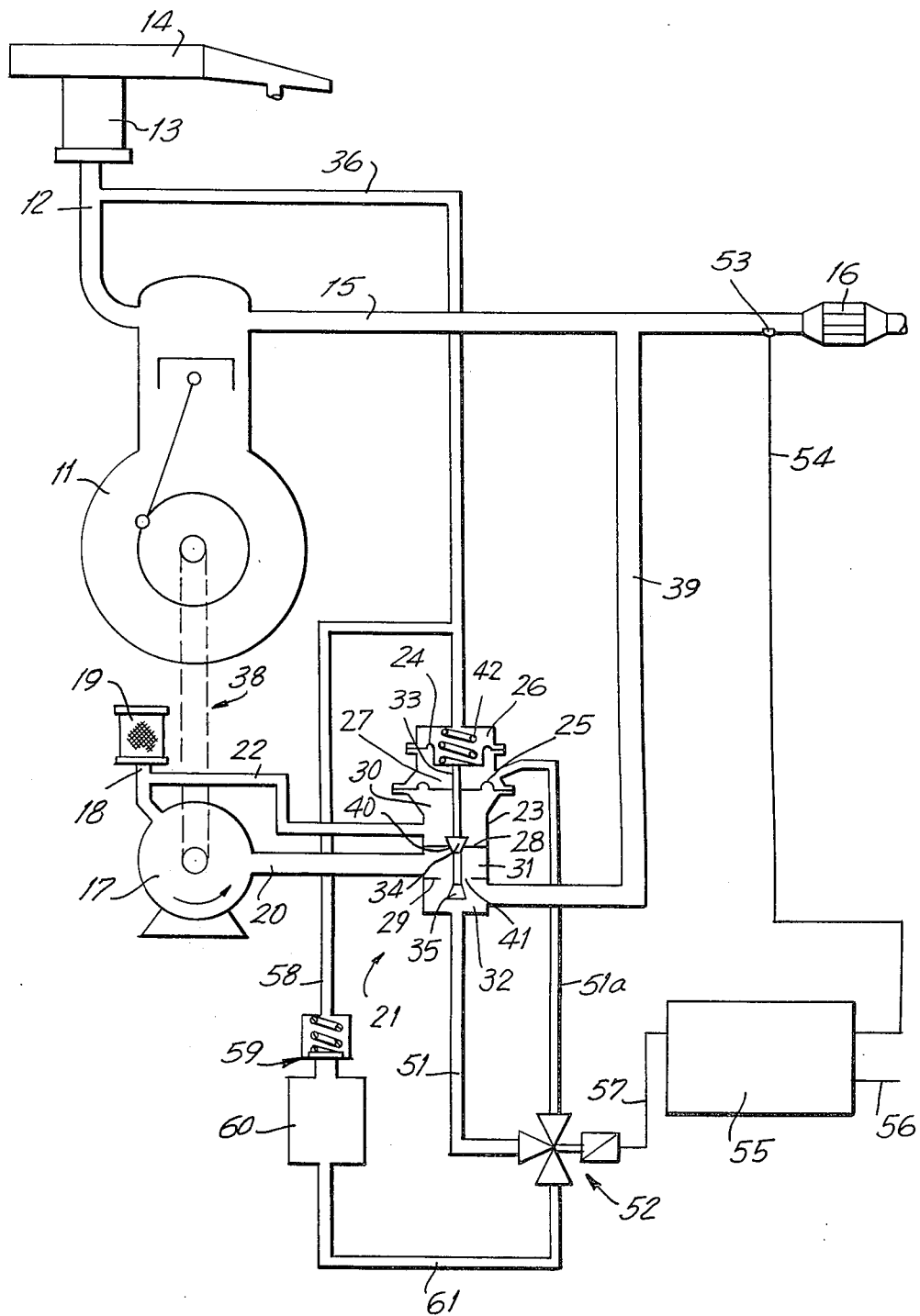
FIG. 4 illustrates an internal combustion engine air intake and exhaust system showing a fourth embodiment of a control installation.

In FIG. 4 there is illustrated another embodiment of the invention, which in the following essentials distinguishes over the embodiment of FIG. 1:

In a signal conduit 51; 51a for the control installation 21 which employs the encountered exhaust gas back-pressure as the control guide condition, there is utilized a control element 52 which is constituted of an electromagnetically actuated three-way valve. The withdrawal of the exhaust gas back-pressure, in this instance, is not obtained from conduit 39 but, in a manner similar to FIGS. 2 and 3, from the pressure chamber 32. Upstream of the after-burner 16, a sensor 53 is located in the exhaust gas collecting conduit 15 so as to facilitate the measurement of the oxygen content in the exhaust gases. The sensor consists of a measured value receiver which includes a platinum-coated wall formed of zirconium oxide. The measured value receiver is positioned so that the wall communicates with one surface thereof with the exhaust gases being measured, and its other surface with the atmosphere.

The sensor 53 conveys a voltage signal, dependent upon the continuously measured oxygen content of the exhaust gases, through an electrical conduit 54 into a signal converter or transformer 55. The signal converter 55, which is basically a conventional threshold circuit normally used with an exhaust gas sensor, by means of a conduit 56 and a suitable accumulator battery (not shown), has an operative direct current supplied thereto. The signal converter 55 emanates an intermittent output signal which is conveyed through a conduit 57 to the control element 52. The membrane chamber 27 is subjected to an exhaust gas back pressure which leads to an increase in the secondary air addition, until the sensor 53 again reports the flow of exhaust gas composition toward a leaner direction. The control sequence again repeats continuously in the aforementioned manner, so as to be able to provide intermittent control of the electromagnet valve 52.

A signal conduit 58 branches from conduit 36 and similarly leads through a non-return valve 59, a reserve container or vacuum storage accumulator 60 and a vacuum signal conduit 61, to control element 52. The vacuum in this storage accumulator 60 is generated through the conduits 58 and 36. As soon as the vacuum or reduced pressure in the suction tube 12 is higher than the vacuum in the storage volume 60, the return valve 59 is opened and the receptacle 60 is evacuated. In all cases, in which the vacuum in receptacle 60 is higher than the reduced pressure in the suction tube 12, the valve remains closed. The reduced pressure in the storage 16 is required in order to provide for the availability of various control pressures upon the switching over of the electromagnetic three-way valve 52. The control element 52 is in a position to, in accordance with the received impulse signals, to connect, with variable interruption intervals, the signal conduit 51a with either the signal conduit 51 or 61. In dependence upon the interruption intervals, a predetermined pressure is generated in the control pressure chamber 27, so as to effect a precise regulation on the considerably differently sized operative surfaces of the membranes 24 and 25.

Figure 5:
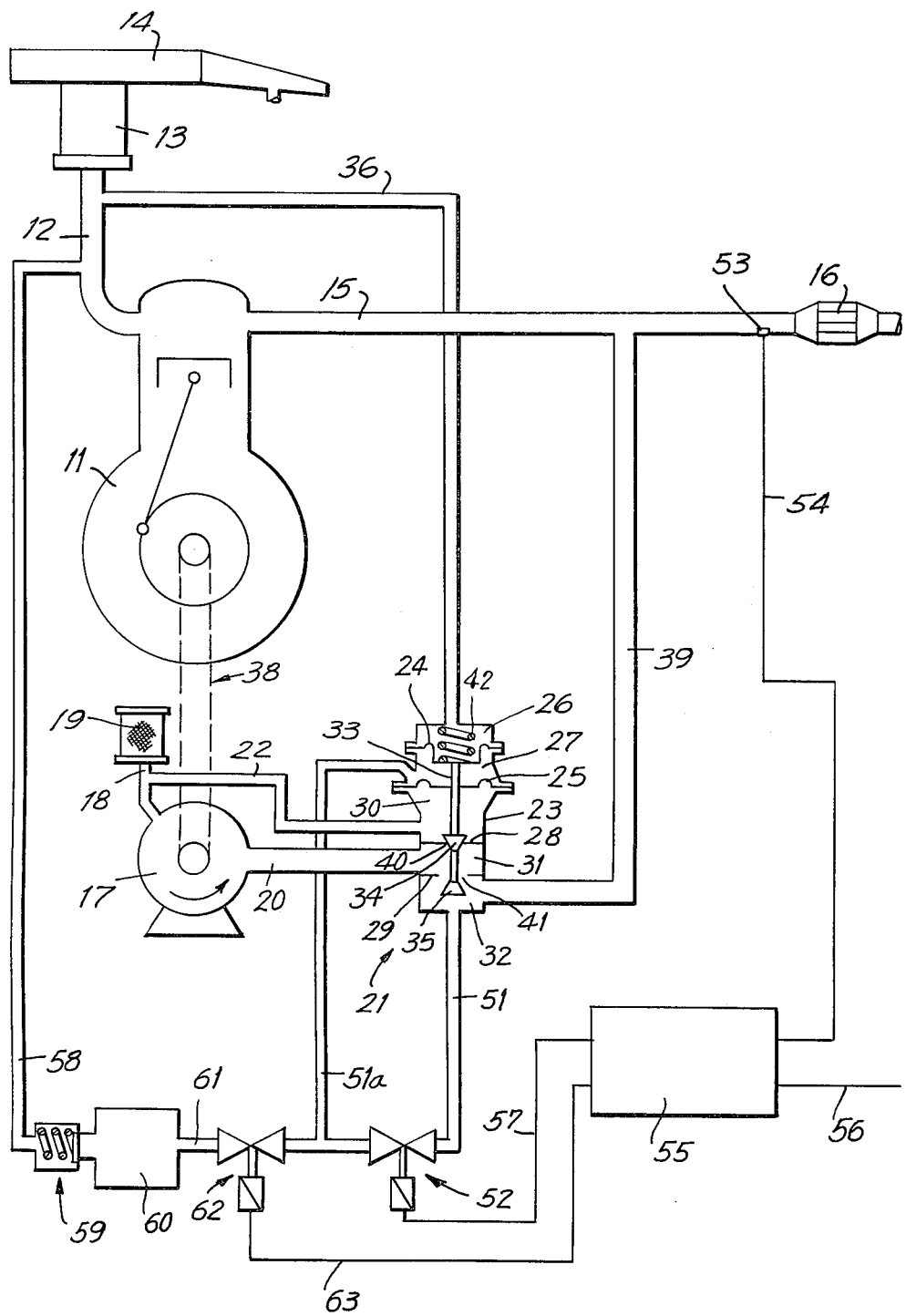
FIG. 5 illustrates the system of FIG. 4 with a fifth embodiment of a control installation.

In FIG. 5 a further embodiment of the invention is disclosed, which varies in the following particulars from the embodiment of FIG. 4:

The control element 52, in this instance, consists of an electro-magnetically actuated through-flow valve. In a signal conduit 61 there is positioned a second control element 62, which consists of a similar electro-magnetically actuated through-flow valve. A conduit 57 leads from the signal converter 55 to the control element 52, and another conduit 63 leads to control element 62. In this embodiment, the control of each of the control elements 62 and 52 may be effected independently of each other. This particular utilization provides for a "dead" or neutral range of the control between two signal impulse peak values, which allows for the switching frequency to be lowered, and a reduction in the volume of the reserve container 60.

Figure 6:
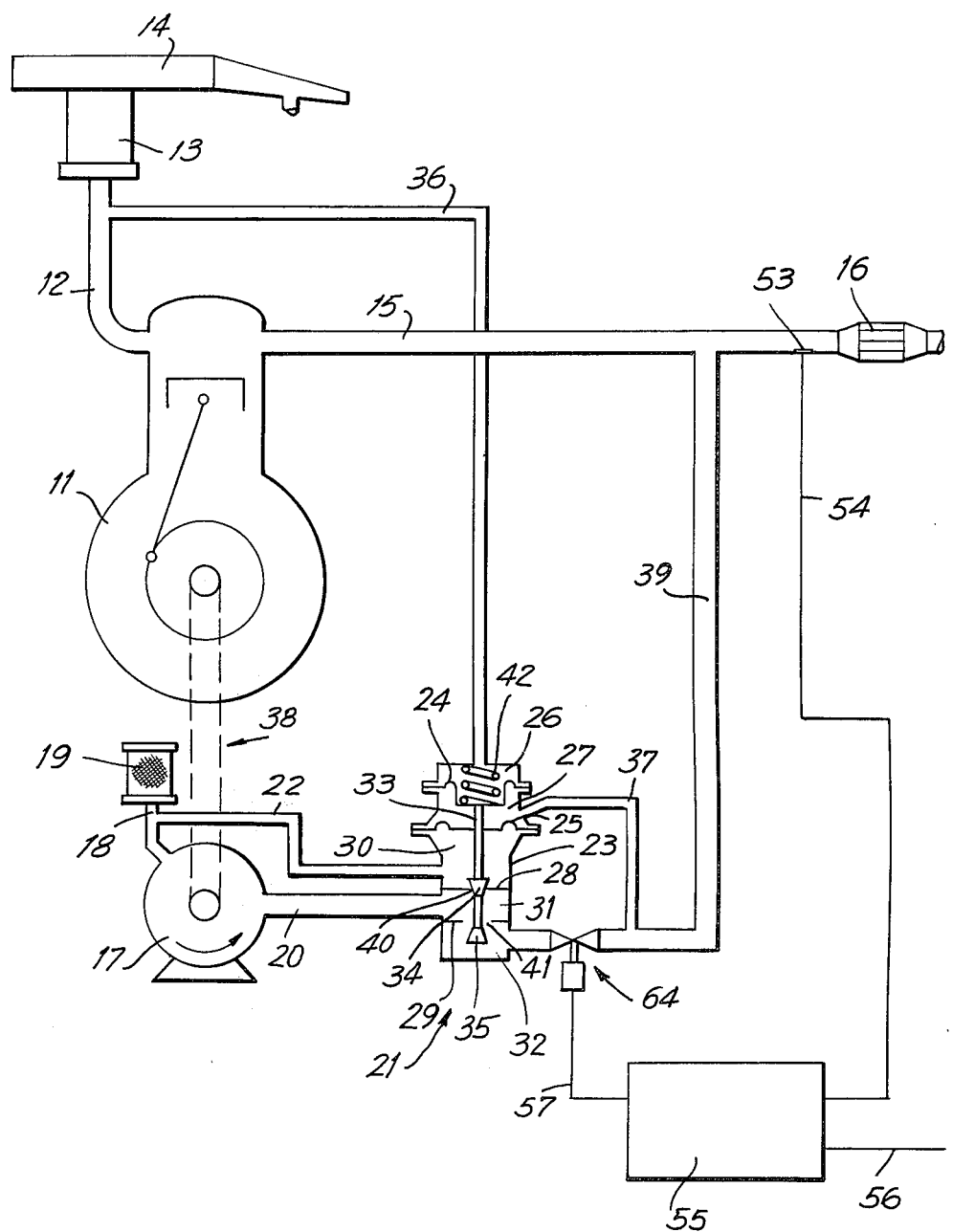
FIG. 6 illustrates the system of FIG. 4 with a sixth embodiment of a control installation.

A further embodiment of the invention is illustrated in FIG. 6, and which varies in the following essentials from the embodiment of FIG. 1:

At the output of the control installation 21 for the addition of the secondary air there is provided a control element 64 which is actuated through the intermediary of conduit 57 by the output signals of signal converter 55, the latter of which receives signals from sensor 53 through conduit 54. In this embodiment the sensor 53 has, as described in greater detail in FIG. 4, a platinum-coated wall formed of zirconium oxide.

Through a conduit 56, the signal converter 55 is provided with an operative direct current voltage from an accumulator battery (not shown). The advantage of this arrangement lies in that the unavoidable time delays in commencing with air additions are still further reduced.

Figure 7:
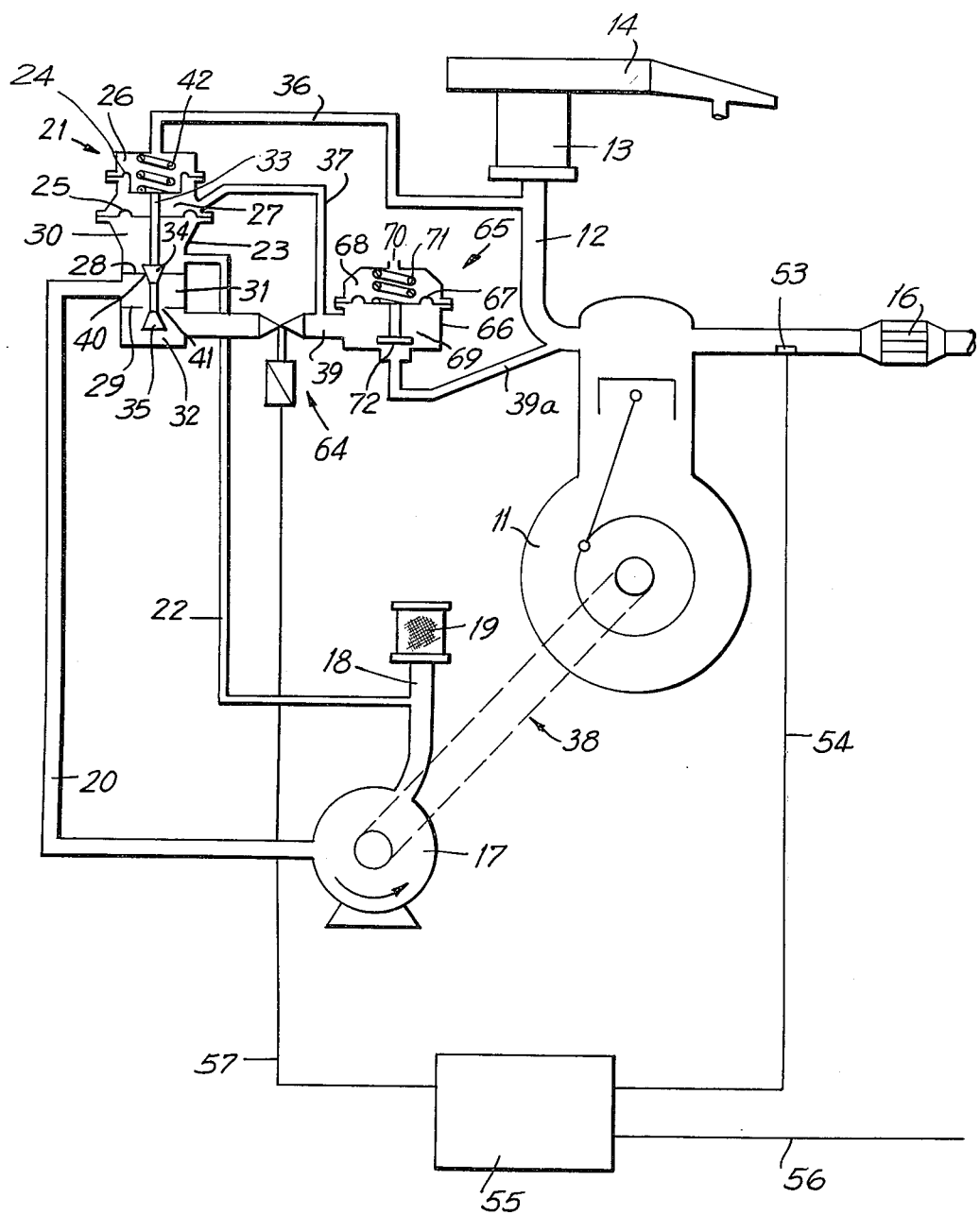
FIG. 7 illustrates a modified system with a seventh embodiment of a control installation.

The inventive embodiment according to FIG. 7 shows, in contrast to all of the other embodiments, an addition of secondary air at the suction side of the internal combustion engine. A further distinction lies in that, in the conduit 39, 39a through which the secondary air is conveyed into the suction conduit 12, there is positioned a secondary air through-flow control valve 65 which maintains the valve inlet pressure at a constant value. The control valve 65 consists of a housing 66 which is divided by a membrane 67 into a control pressure chamber 68 and a pressure chamber 69. An aperture 70 provides communication between the control pressure chamber 68 and atmosphere. The membrane 67 which is subjected to a biasing force by a compression spring 71, during inaction, locates a closure element 72 which is connected thereto into a closed position. Upon the pressure in conduit 39 reaching a predetermined value, the valve outlet is opened by the closure element 72 in opposition to the biasing force exerted by the spring-loaded membrane 67.

The construction and switching action of the control element 64, the signal converter 55, and of the sensor 53 corresponds to that described in the embodiment of FIG. 6.

The quantity in the air conveyed from the air pump 17 in response to the rotational speed of the engine, is conveyed through conduit 20 into the control installation 21, whose function has been described in connection with the embodiment of FIG. 1. The occasional disturbing oscillations which occur in the suction tube pressure are maintained remote from the pressure chamber 32 of control installation 21 through the intermediary of the control valve 65. As distinguished from all of the other embodiments, the exhaust gas back-pressure is not conveyed through conduit 37, but the controlled pressure in the conduit 39 is conveyed as the control guide condition into the control pressure chamber 27 of the control installation 21.

The advantage of this arrangement consists of in that the operative engine combustion is effectively controlled by the addition of air and improved thereby, and in which above all an even more increased constant control time is obtained in comparison with the other embodiments of the invention.

In addition to the above-enumerated advantages of the present invention it is also emphasized that in view of the inventive fine precision control over the addition of secondary air, the conversion of the deleterious materials which are contained in the exhaust gases of the internal combustion engine are adapted to be converted into harmless components for the purposes of universal protection, to the optimum extent.

While there has been shown what is considered to be the preferred embodiment of the invention, it will be obvious that modifications may be made which come within the scope of the disclosure of the specification.

What we claim is:

1. An installation for the proportionate addition of secondary air employed in the optimum combustion and after-burning of the exhaust gases of an internal combustion engine, comprising; an engine-driven air pump control means for introducing predetermined quantities of said secondary air; means located externally of said control means being responsive to at least one of a plurality of engine operating conditions consisting of the pressure of the engine suction side, the engine exhaust gas back-pressure, engine rotational speed, exhaust gas oxygen content, and exhaust gas carbon monoxide content for regulating said control means; said control means including means for the withdrawal of a portion of the secondary air conveyed through said control means and conducting said withdrawn secondary air to the suction side of said air pump, said air pump returning said secondary air from the pressure side of said air pump to said control means; means for determining the rate of feed of the secondary air and the quantity of the air portion withdrawn from said control means to said air pump, said means including two spaced conical valve means controlling flow passages through said control means, said valve means being mounted on a common actuating control rod and being positioned so that, during an increase of the fed quantity of secondary air, the quantity of the withdrawn air portion is reduced, said actuating control rod for said conical valve means being rigidly connected to two spaced upper and lower membranes having unequal operative surfaces, said membranes defining therebetween a first control pressure chamber communicating with the exhaust gas back-pressure of said engine, and a second control pressure chamber located above the upper membrane communicating with the suction side pressure of said engine.

2. An installation as claimed in claim 1, said second control pressure chamber above the upper membrane including an inlet aperture, a non-return valve means being positioned in said inlet aperture so as to facilitate unrestricted inflow into said control pressure chamber, and a small bypass aperture bridging said non-return valve so as to limit outflow from said control pressure chamber to said bypass aperture.

* * * * *